Sept. 23, 1941.  W. J. PHANEUF  2,256,573
STRIPPING BROACH
Filed March 10, 1941
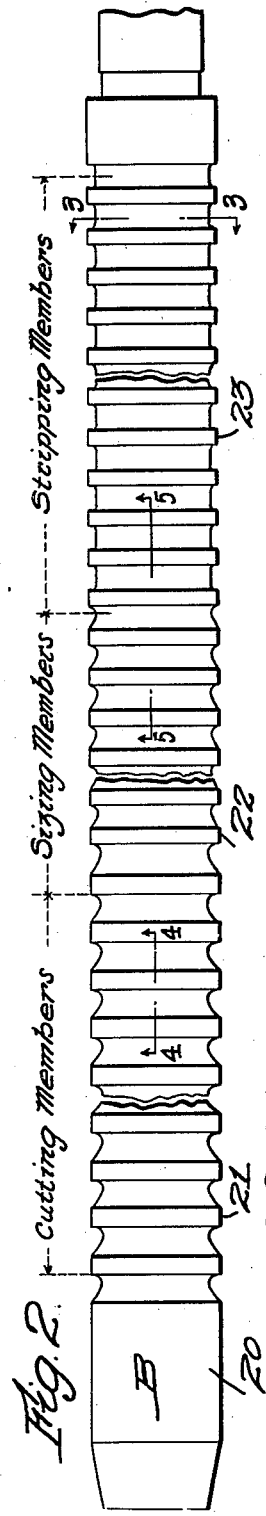
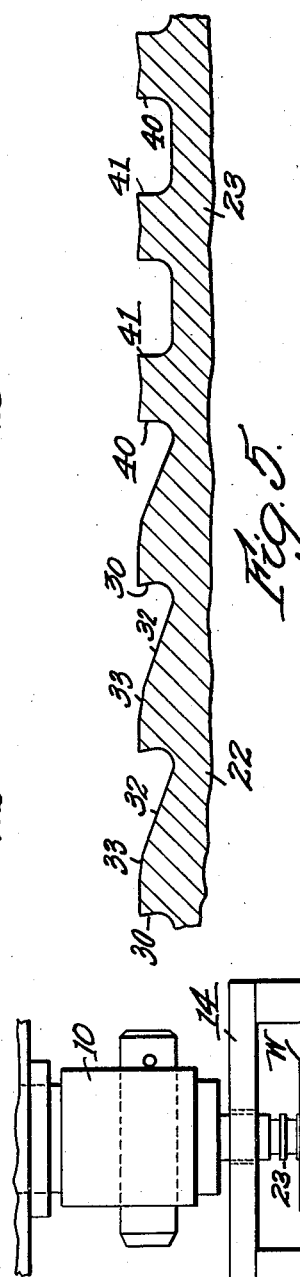
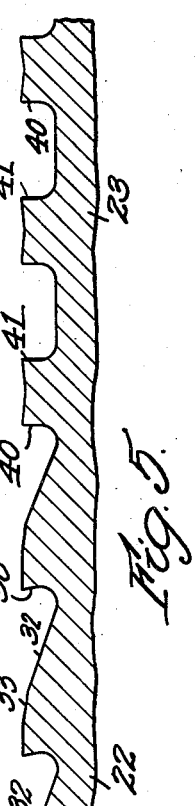
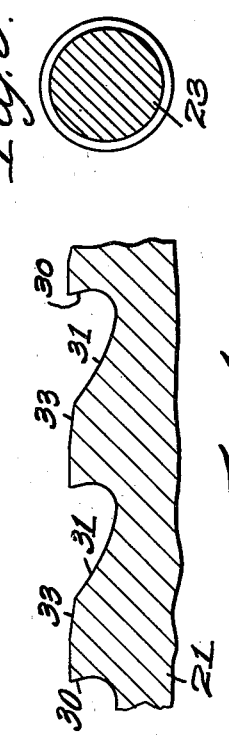
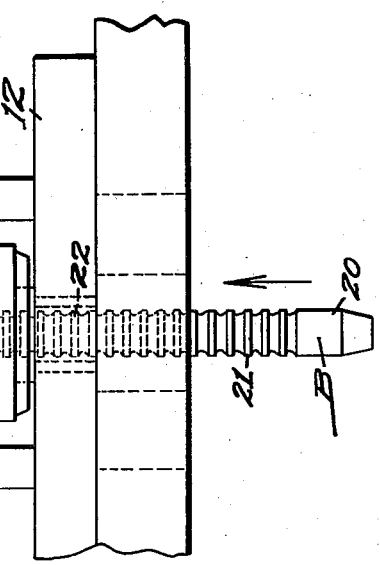
Inventor
Wilrose J. Phaneuf Patented Sept. 23, 1941

2,256,573

UNITED STATES PATENT OFFICE 2,256,573

STRIPPING BROACH

Wilrose J. Phaneuf, Hudson, Mass., assignor to The Lapointe Machine Tool Company, Hudson, Mass., a corporation of Maine Application March 10, 1941, Serial No. 382,617

4 Claims. (Cl. 29—95.1)

This invention relates to broaches used in sizing holes or other openings in machine parts. In the operation of such broaches, it is customary to pass the broach entirely through the hole, and to disconnect and remove the broach from the broaching head before the head returns to its initial position.

It is the general object of my present invention to provide an improved broach commonly termed a "stripper broach" which is so designed and constructed that the broach may be drawn back through a broached hole without injury to either the tool or the work.

To the attainment of this object, I provide a broach having certain of its cutting members formed with both front and back cutting edges, by which construction withdrawal of the broach is made harmless and practicable.

My invention further relates to arrangements and combinations of parts which will be hereinafter described and more particularly pointed out in the appended claims.

A preferred form of the invention is shown in the drawing, in which

Fig. 1 is a partial front elevation of parts of a push broaching machine adapted to use my improved broach;

Fig. 2 is a side elevation of my stripper broach, partially broken away to reduce length;

Fig. 3 is a transverse sectional view, taken along the line 3—3 in Fig. 2; and

Figs. 4 and 5 are fragmentary sectional longitudinal views, taken along the lines 4—4 and 5—5 in Fig. 2 respectively.

Referring to Fig. 1, I have shown my improved stripper broach B mounted in the broach head or broach holder 10 of a push-type broaching machine. A rough hole in the work W is broached and sized by pushing the broach B downward through the work to the final position shown in Fig. 1.

The work W is mounted on a rigid platen or work support 12, and a stripper plate 14 is mounted in fixed position above the platen 12 and limits upward movement of the work W with the broach B as the broach is withdrawn.

My improved broach as shown in the drawing is designed for broaching circular holes, but it will be understood that my invention is not limited to a circular broach but may be equally well adapted to the broaching of holes of any other desired shape, such as square, rectangular or elliptical.

My improved broach comprises a pilot portion 20, a section of cutting members 21, a section of sizing members 22, and a section of stripping members 23. All of the members 21, 22 and 23, as shown herein, are of the circular section shown in Fig. 3, as is also the pilot 20.

The cutting members 21 and the sizing members 22 are of the type commonly used on similar broaches and are provided with the usual front cutting edges 30, which may be slightly undercut as indicated in Figs. 4 and 5 if so desired. The cutting members 21 and 22 are reenforced at the back by inclined portions 31 (Fig. 4) or 32 (Fig. 5) and the periphery of each cutting member 21 or 22 is to be relieved in the usual manner, as indicated at 33.

The members 21 increase in diameter slightly but progressively toward the right, as viewed in Fig. 2, and the members 22 are commonly of the uniform diameter required to produce a hole of the desired finish size.

The stripping members 23 (Figs. 2 and 5) are each provided with a front cutting edge 40 and with a back cutting edge 41, and these stripping members also have a double relief from both the front and back edges toward the axial center of each cutting member, as clearly shown in Fig. 5. The stripping members 23 are commonly of substantially the same external diameter as the sizing members 22.

In the use of my improved broach, the broach head 10 and broach B are first raised to the highest position, after which the work W is placed on the platen 12. The broach head and broach are then forced downward by hydraulic or other suitable power mechanism. During such downward movement, the pilot portion 20 first enters the work W and centers the work with respect to the broach.

The cutting members 21 are then forced through the hole in the work, roughing and then progressively increasing the broached hole until it is of substantially full diameter. The sizing members 22 are then forced through the partly broached hole to provide the desired accurate size and finish.

The broach B is then forced further downward to the position shown in Fig. 1, in which position only certain of the stripping members 23 remain in the work. As the broach is thereafter pulled upward, while the work is held by the stripper plate 14, the broach is pulled backward out of the work, and the back edges 41 of the stripping members 23 complete the sizing of the hole.

The members 23 also clear the hole of any chips or particles of stock remaining therein which would otherwise be caught by the relieved portions 33 of the cutting and sizing members. If so caught they frequently will be "frozen" to said members in such a way that the broached hole would be damaged or the edge of the cutting member would be broken off if the broach was withdrawn.

By the provision of back cutting edges adapted to clear the work at the beginning of the return stroke, I make it possible to push a broach through a piece of work and to immediately withdraw the broach without injury to either tool or work. This effects a very substantial saving in time and labor, as it is no longer necessary to release and remove the broach after each broaching operation.

If desired, the sizing members may be omitted and the stripping members may also act as sizing members.

Having thus described my invention and the advantages thereof, I do not wish to be limited to the details herein disclosed, otherwise than as set forth in the claims, but what I claim is:

1. A stripping broach comprising a series of axially successive cutting members progressively increasing in diameter and having front cutting edges only, and a series of stripping members aligned with said cutting series, each stripping member having both front and back cutting edges and each stripping member being effective to cut in both directions of travel of said broach.

2. A stripping broach comprising a series of axially successive cutting members progressively increasing in diameter and having front cutting edges only, followed by a series of stripping members of substantially uniform diameter and each having both front and back cutting edges, said stripping members being effective to cut in both directions of travel of said broach.

3. A stripping broach comprising a series of axially successive cutting members progressively increasing in diameter and having front cutting edges only, a series of sizing members following said cutting series and of substantially uniform diameter and having front cutting edges only, and a series of stripping members following said sizing series, each of said stripping members having both front and back cutting edges and being effective to cut in both directions of travel of said broach.

4. A stripping broach comprising a series of axially successive cutting members progressively increasing in diameter and having front cutting edges only, a series of sizing members following said cutting series and of substantially uniform diameter and having front cutting edges only, and a series of stripping members following said sizing series and of substantially the same diameter as said sizing members, each of said stripping members having both front and back cutting edges and each of said stripping members being effective to cut in both directions of travel of said broach.

WILROSE J. PHANEUF.